(12) United States Patent
Watanabe et al.

(10) Patent No.: US 10,291,078 B2
(45) Date of Patent: May 14, 2019

(54) WIRELESS POWER TRANSMITTER

(71) Applicant: ROHM CO., LTD., Ukyo-ku, Kyoto (JP)

(72) Inventors: Masatoshi Watanabe, Kyoto (JP); Tomoya Morinaga, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 64 days.

(21) Appl. No.: 15/696,987

(22) Filed: Sep. 6, 2017

(65) Prior Publication Data

US 2017/0366048 A1 Dec. 21, 2017

Related U.S. Application Data

(63) Continuation of application No. PCT/JP2016/053042, filed on Feb. 2, 2016.

(30) Foreign Application Priority Data

Mar. 4, 2015 (JP) ................. 2015-042687

(51) Int. Cl.
*H02J 50/12* (2016.01)
*H02J 50/60* (2016.01)
*H04B 5/00* (2006.01)

(52) U.S. Cl.
CPC .............. *H02J 50/60* (2016.02); *H02J 50/12* (2016.02); *H04B 5/0037* (2013.01); *H04B 5/0093* (2013.01)

(58) Field of Classification Search
None
See application file for complete search history.

(56) References Cited

U.S. PATENT DOCUMENTS

| | | | | |
|---|---|---|---|---|
| 9,553,485 B2 * | 1/2017 | Singh | ...................... | H02J 17/00 |
| 9,762,091 B2 * | 9/2017 | Oosumi | .................. | H02J 50/10 |
| 9,893,568 B2 * | 2/2018 | Watanabe | ............... | H02J 50/80 |
| 9,906,044 B2 * | 2/2018 | Dibben | .................... | H02J 5/005 |
| 9,906,047 B2 * | 2/2018 | Lemmens | ............... | H02J 5/005 |
| 10,128,696 B2 * | 11/2018 | Iwasaki | .................. | H02J 7/025 |

(Continued)

FOREIGN PATENT DOCUMENTS

| CN | 101981780 A | 2/2011 |
|---|---|---|
| JP | 2011507481 A | 3/2011 |
| JP | 2012005238 A | 1/2012 |

(Continued)

OTHER PUBLICATIONS

International Preliminary Report on Patentability corresponding to Application No. PCT/JP2016/053042; dated Sep. 5, 2017.

(Continued)

*Primary Examiner* — Jeffery S Zweizig
(74) *Attorney, Agent, or Firm* — Cantor Colburn LLP

(57) ABSTRACT

A transmission antenna includes a resonance capacitor and a transmission coil coupled in series. A driver includes a bridge circuit that applies a driving voltage to the transmission antenna. A current sensor detects a current IS that flows through the bridge circuit. A foreign object detector detects the current IS that flows through the bridge circuit while changing the switching frequency applied to the bridge circuit. The foreign object detector judges the presence or absence of a foreign object based on the detection result.

14 Claims, 6 Drawing Sheets

(56) References Cited

U.S. PATENT DOCUMENTS

2012/0175967 A1    7/2012  Dibben et al.

FOREIGN PATENT DOCUMENTS

| JP | 5071574 A | 11/2012 |
| JP | 2013017336 A | 1/2013 |
| JP | 2013038854 A | 2/2013 |
| JP | 2013173790 A | 9/2013 |
| JP | 2014187795 A | 10/2014 |
| WO | 2009081115 A1 | 7/2009 |

OTHER PUBLICATIONS

International Search Report corresponding to Application No. PCT/JP2016/053042; dated May 10, 2016.
JP Notification of Reasons for Refusal corresponding to Application No. 2015-042687; dated Jun. 5, 2018.

* cited by examiner

WIRELESS POWER TRANSMITTER

CROSS REFERENCE TO RELATED APPLICATIONS

The present application is a continuation of PCT/JP2016/053042, filed on Feb. 2, 2016 and claims priority under 35 U.S.C. § 119 to Japanese Patent Applications No. 2015-042687, filed on Mar. 4, 2015, the entire contents of which are both incorporated herein by reference.

BACKGROUND OF THE INVENTION

1. Field of the Invention

The present invention relates to a wireless power supply technique, and particularly to foreign object detection.

2. Description of the Related Art

In recent years, in order to supply electric power to an electronic device, wireless power supply has begun to come into commonplace use. In order to advance the compatibility of products between manufacturers, the WPC (Wireless Power Consortium) has been organized, and the WPC has developed the Qi standard as an international standard.

The wireless power supply that conforms to the Qi standard uses electromagnetic induction between a transmission coil and a reception coil. A power supply system is configured including a power transmitter having a power transmission coil and a power receiver having a reception coil.

FIG. 1 is a diagram showing a configuration of a wireless power supply system 10 that conforms to the Qi standard. The power supply system 10 includes a power transmitter 20 (TX) and a power receiver 30 (RX). The power receiver 30 is mounted on an electronic device, examples of which include cellular phone terminals, smartphones, audio players, game machines, and tablet terminals.

The power transmitter 20 includes a transmission coil (primary coil) 22, a driver 24, a controller 26, and a demodulator 28. The driver 24 includes an H-bridge circuit (full-bridge circuit) or otherwise a half-bridge circuit. The driver 24 applies a driving signal S1, specifically, in the form of a pulse signal, to the transmission coil 22. This provides a driving current flowing through the transmission coil 22, which generates an electric power signal S2 at the transmission coil 22 in the form of an electromagnetic signal. The controller 26 integrally controls the overall operation of the power transmitter 20. Specifically, the controller 26 controls the switching frequency of the driver 24 or otherwise the duty ratio of the switching of the driver 24 so as to adjust the electric power to be transmitted.

In the Qi standard, a protocol is defined for communication between the power transmitter 20 and the power receiver 30, which enables information transmission from the power receiver 30 to the power transmitter 20 via a control signal S3. The control signal S3 is transmitted from a reception coil 32 (secondary coil) to the transmission coil 22 in the form of an AM (Amplitude Modulation) modulated signal using backscatter modulation. The control signal S3 includes electric power control data (which will also be referred to as a "packet") which controls an amount of electric power to be supplied to the power receiver 30, and data which indicates the particular information for identifying the power receiver 30. The demodulator 28 demodulates the control signal S3 included in the current or otherwise the voltage applied to the transmission coil 22. The controller 26 controls the driver 24 based on the power control data included in the control signal S3 thus demodulated.

The power receiver 30 includes the reception coil 32, a rectifier circuit 34, a smoothing capacitor 36, a modulator 38, a load 40, a controller 42, and a power supply circuit 44. The reception coil 32 receives the electric power signal S2 from the transmission coil 22, and transmits the control signal S3 to the transmission coil 22. The rectifier circuit 34 and the smoothing capacitor 36 rectify and smooth a current S4 induced at the reception coil 32 according to the electric power signal S2, thereby converting the current S4 into a DC voltage.

Using electric power supplied from the power transmitter 20, the power supply circuit 44 charges an unshown secondary battery or steps up or otherwise steps down the DC voltage $V_{RECT}$, so as to supply the DC voltage to the controller 42 or other circuits such as the load 40.

The controller 42 monitors the electric power supplied to the load 40, and generates electric power control data according to the electric power thus monitored, for controlling the amount of electric power to be transmitted from the power transmitter 20. The modulator 38 modulates the control signal S3 including the electric power control data so as to modulate the coil current that flows through the reception coil 32, thereby modulating the coil current and coil voltage applied to the transmission coil 22.

With the power supply system 10, the power transmitter 20 and a power receiver (electronic device) are located within a space with a relatively high degree of freedom. Thus, it is conceivable that a state can occur in which there is an electro-conductive foreign object such as a piece of metal or the like between, or otherwise in the vicinity of, the transmission coil 22 and the reception coil 32. In a case in which wireless power supply is performed in such a state, a current flows through such a foreign object, leading to a problem of power loss. Also, this leads to a problem of the foreign object heating up. In view of such a situation, foreign object detection (FOD) has been designed in the WPC1.1 (System Description Wireless Power Transfer Volume I: Low Power Part 1: Interface Definition Version 1.1) specification.

In such FOD, the electric power transmitted by the power transmitter 200 is compared with the electric power received by the power receiver 300. When the difference between them is greater than an allowable value, judgement is made that a foreign object is present.

Development is currently being advanced for the Qi standard, which supports middle power (Volume II Middle Power). As one example thereof, an arrangement is known that is configured to use the Q value of the transmission coil (antenna). Specifically, an arrangement is known that is configured to judge the presence or absence of a foreign object based on a change in the Q value of the transmission antenna that occurs when a foreign object is located in the vicinity of the transmission coil.

SUMMARY OF THE INVENTION

The present invention has been made in order to solve such a problem. Accordingly, it is an exemplary purpose of an embodiment of the present invention to provide a power transmitter that is capable of detecting a foreign object.

An embodiment of the present invention relates to a wireless power transmitter structured to transmit an electric power signal to a wireless power receiver. The wireless power transmitter comprises: a transmission antenna comprising a resonance capacitor and a transmission coil coupled in series; a driver comprising a bridge circuit structured to apply a driving voltage to the transmission antenna; a current sensor structured to detect a current that flows trough the bridge circuit; and a foreign object detector structured to detect the current that flows through the bridge circuit while changing a switching frequency applied to the bridge circuit, and to judge a presence or absence of a foreign object based on detection results.

The frequency characteristics of the current that flows through the bridge circuit, e.g., the center frequency that defines the peak and the bandwidth, change according to a situation in the vicinity of the transmission antenna. Thus, by detecting the frequency characteristics of the current that flows through the bridge circuit, this allows a foreign object to be detected. With such an embodiment, this allows the foreign object detector to have a markedly simple circuit configuration as compared with conventional techniques, thereby allowing costs to be reduced.

Also, the foreign object detector may be structured to judge the presence or absence of a foreign object based on a frequency $f_0$ at which a peak of the current occurs, and a frequency $f_1$ at which the current is smaller than the peak by a predetermined ratio between them.

Also, the foreign object detector may be structured: (i) to acquire the frequency $f_0$ and a current value $I_{MAX}$ at the frequency $f_0$ while sweeping up the switching frequency for the bridge circuit with a frequency that is lower than a resonance frequency of the transmission antenna as a start frequency; (ii) to calculate a current $I_{LOW}$ by multiplying the current value $I_{MAX}$ by the predetermined ratio; and (iii) to acquire the frequency $f_1$ when the detected current matches the current $I_{LOW}$ while the switching frequency is swept up.

The predetermined ratio may be $1/\sqrt{2}$.

Also, the foreign object detector may be structured to calculate a Q value based on $Q=f_0/(2\times|f_0-f_1|)$, and to judge the presence or absence of a foreign object based on the Q value thus calculated.

Also, the foreign object detector may be structured to receive the threshold value from the wireless power receiver.

Also, the current sensor may be structured to detect a current that flows into an upper-side power supply terminal of the bridge circuit from a DC power supply.

In this case, the current sensor measures the current that is close to a DC current, thereby providing improved detection precision. In particular, in a case in which a smoothing capacitor is coupled to the upper-side power supply terminal of the bridge circuit, this provides marked effects on the detection precision.

The current sensor may detect a current that flows to the ground from the lower-side power supply terminal of the bridge circuit. This allows the current sensor to measure the current that is close to a DC current, thereby providing improved detection precision.

Also, the current sensor may comprise: a detection resistor arranged on a path of a current to be detected; a sensing amplifier structured to amplify a voltage drop across the detection resistor; a low-pass filter structured to receive an output of the sensing amplifier; and an A/D converter structured to convert an output of the low-pass filter into a digital value.

Also, the current sensor may be shared as a current detection circuit structured to detect a current required to calculate transmitted electric power.

In this case, an additional hardware component can be further omitted.

Also, the wireless power transmitter may be structured to support the Qi standard.

Examples of "such an arrangement that supports the standard" include an arrangement (compatible arrangement) that has not passed an identification test but that supports equivalent (compatible) functions, in addition to an arrangement (that conforms to the standard) that has passed an identification test in conformance with the standard.

Another embodiment of the present invention relates to a charger. The charger comprises any one of the aforementioned wireless power transmitters.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

Figure 1:
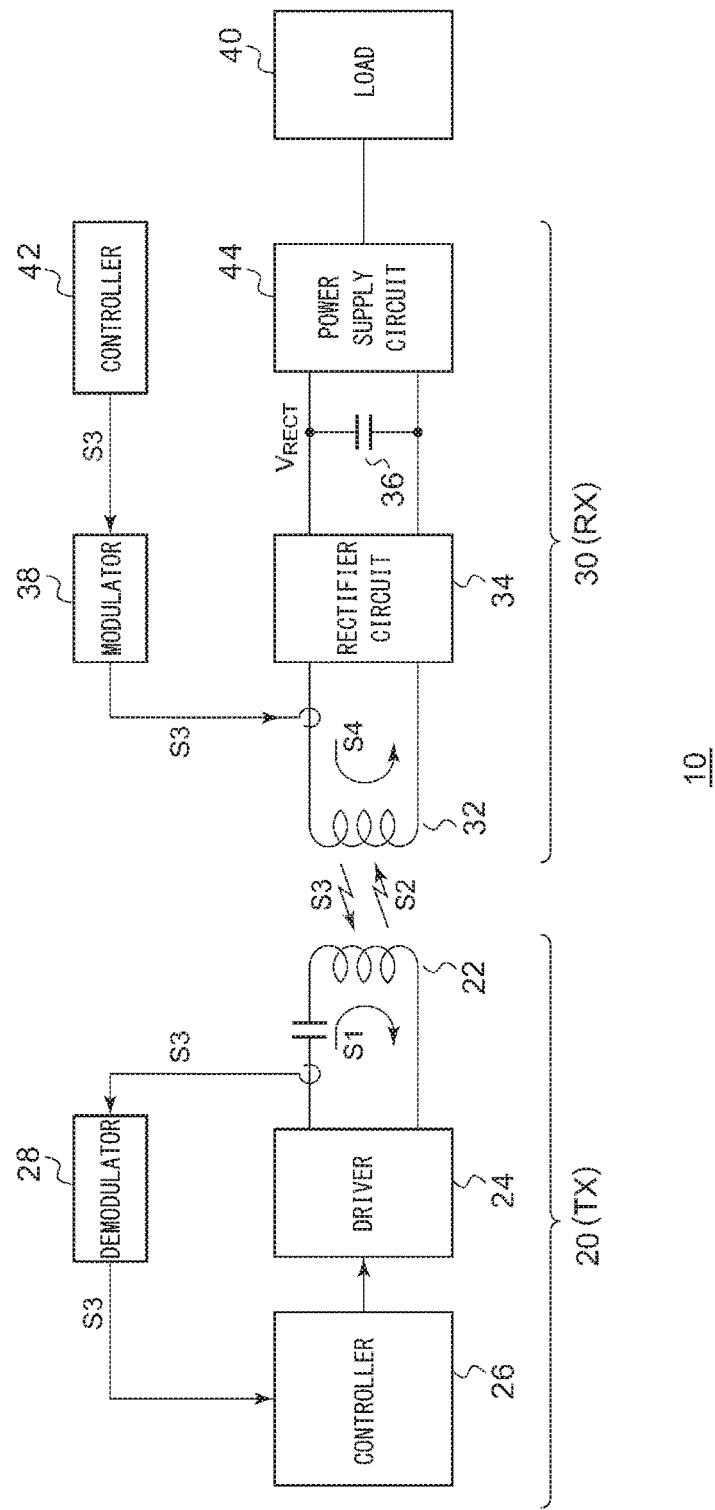
FIG. 1 is a diagram showing a configuration of a wireless power supply system that conforms to the Qi standard.
Figure 2:
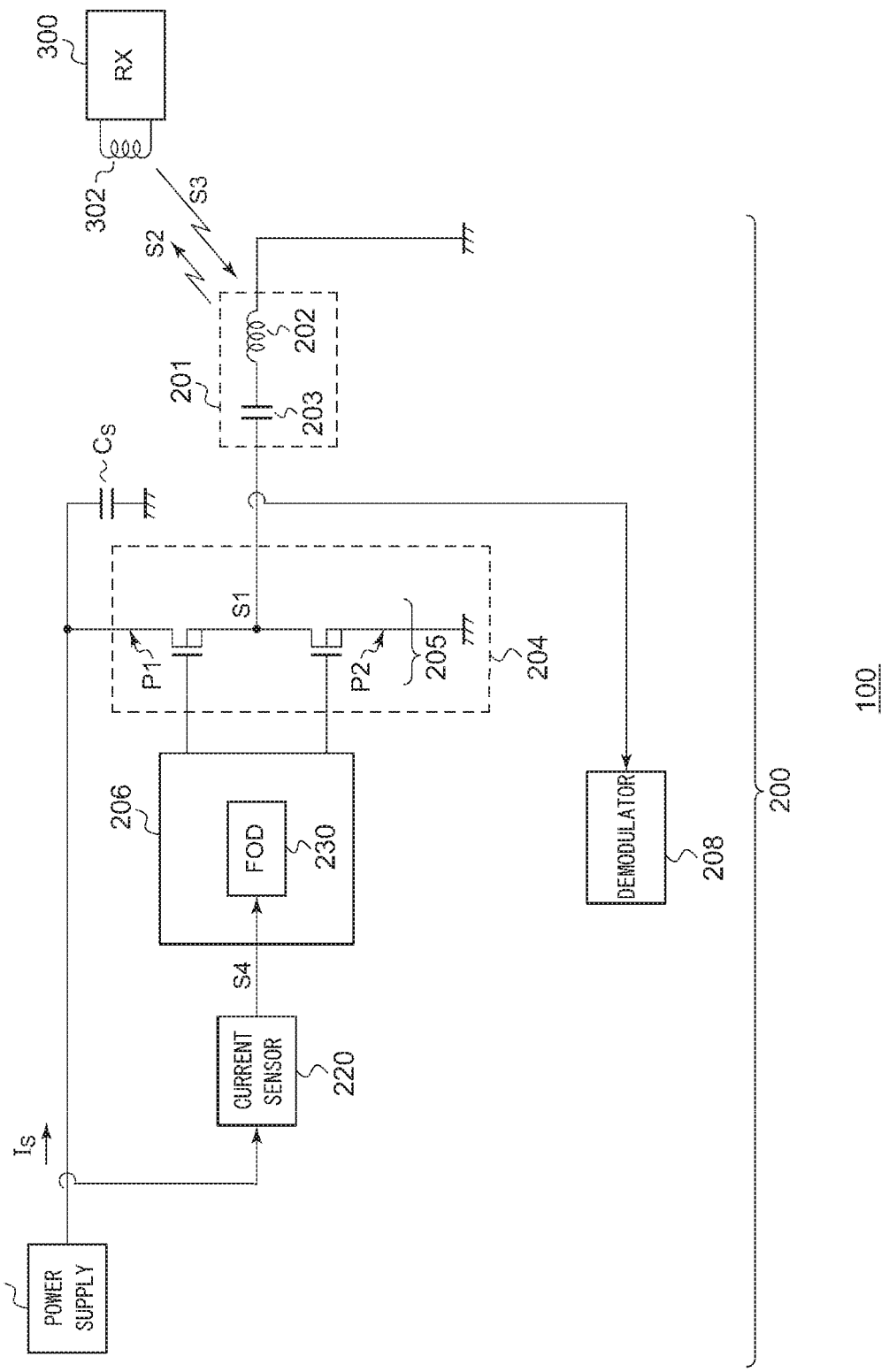
FIG. 2 is a block diagram showing a power supply system including a wireless power transmitter according to an embodiment.

FIG. 2 is a block diagram showing a power supply system 100 including a wireless power transmitter according to an embodiment. The power supply system 100 includes a power transmitter 200 (TX: Power Transmitter) and a power receiver 300 (RX: Power Receiver). The power receiver 300 is mounted on an electronic device such as a cellular phone terminal, smartphone, audio player, game machine, tablet terminal, or the like.

The power transmitter 200 is mounted on a charger having a charger stand, for example. The transmission apparatus 200 includes a transmission coil (primary coil) 202, a driver 204, a controller 206, a demodulator 208, a DC power supply 210, a current sensor 220.

The driver 204 includes an H-bridge circuit (full-bridge circuit) or otherwise a half-bridge circuit. The driver 204 applies a driving signal S1, and specifically, in the form of a pulse signal, to the transmission coil 202. This provides a driving current flowing through the transmission coil 202, which generates an electric power signal S2 at the transmission coil 202 in the form of an electromagnetic signal. In the present embodiment, a half-bridge circuit 205 is employed. A power supply voltage $V_{DD}$ is supplied from a DC power supply 210 to an upper-side power supply terminal P1 of the half-bridge circuit 205. A lower-side power supply terminal P2 thereof is grounded. A smoothing capacitor $C_S$ is coupled to the upper-side power supply terminal P1.

The controller 206 integrally controls the overall operation of the power transmitter 200. Specifically, the controller 206 controls the switching frequency $f_{SW}$ of the driver 204 or otherwise the duty ratio of the switching of the driver 204 so as to adjust the electric power to be transmitted. The functions and the configuration of the controller 206 may be designed using known techniques, except for those relating to a foreign object detector 230 described later. Accordingly, description thereof will be omitted.

In the Qi standard, a protocol is defined for communication between the power transmitter 200 and the power receiver 300, which enables information transmission from the power receiver 300 to the power transmitter 200 via a control signal S3. The control signal S3 is transmitted from a reception coil 302 (secondary coil) to the transmission coil 202 in the form of an AM (Amplitude Modulation) modulated signal using backscatter modulation. The control signal S3 includes electric power control data (which will also be referred to as a "packet") which controls an amount of electric power to be supplied to the power receiver 300, and data which indicates the particular information for identifying the power receiver 300. Also, the control signal S3 may include a threshold value that defines a suitable range of the Q value of the transmission antenna 201.

The demodulator 208 demodulates the control signal S3 included in the current or otherwise the voltage applied to the transmission coil 202. The controller 206 controls the driver 204 based on the power control data included in the control signal S3 thus demodulated.

Next, description will be made regarding foreign object detection (FOD) employed in the transmission apparatus 200.

In order to support the FOD, the power transmitter 200 includes a current sensor 220 and a foreign object detector 230 of the controller 206.

The current sensor 220 detects a current $I_S$ that flows through the bridge circuit 205, and generates a current detection value S4 that represents an amount of current thus detected. The current detection value S4 is input to the foreign object detector 230 of the controller 206. Examples of a "current that flows through a bridge circuit" include an input current of the bridge circuit, and a current that flows through any one of the arms of the bridge circuit. However, examples of such a current do not include an output current, i.e., a current that flows through the antenna. Also, the input current of the bridge circuit includes a current that flows to the upper-side power supply terminal of the bridge circuit 205, and a current that flows from the lower-side power supply terminal thereof.

Before the start of power transmission to the power receiver 300, a foreign object detection operation is executed as follows.

Specifically, the foreign object detector 230 detects the current $I_S$ that flows through the bridge circuit 205 while changing the switching frequency $f_{SW}$ applied to the bridge circuit 205. Judgement is made regarding the presence or absence of a foreign object based on the detection result of the current $I_S$.

The above is the basic configuration of the power transmitter 200. Next, description will be made regarding the mechanism and the operation of the foreign object detector 230.

Figure 3:
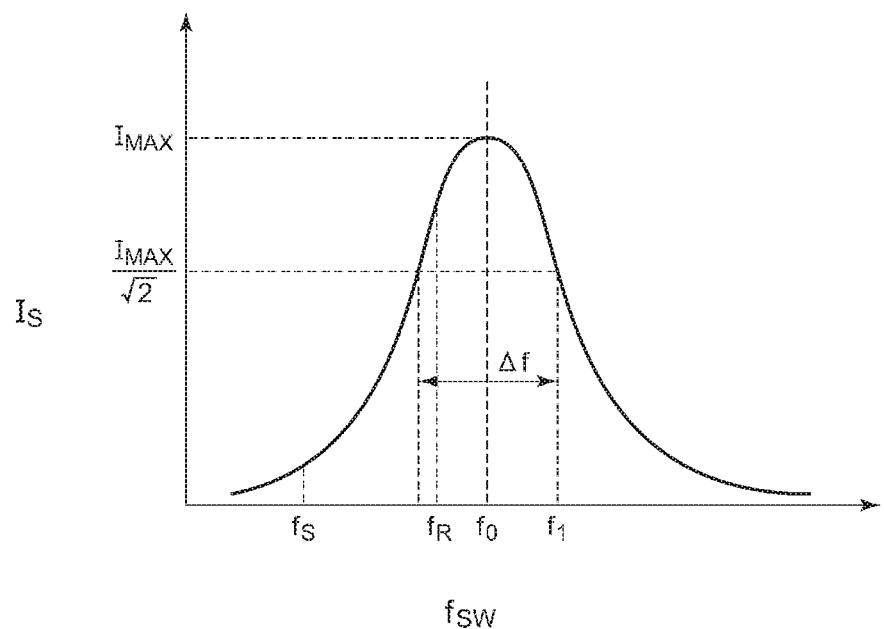
FIG. 3 is a diagram showing the relation between the switching frequency $f_{SW}$ and the current $I_S$ in the bridge circuit.

FIG. 3 is a diagram showing the relation between the switching frequency $f_{SW}$ and the current $I_S$ in the bridge circuit 205. The present inventor has investigated the switching frequency dependence of the current $I_S$ that flows through the bridge circuit 205. As a result, the present inventor has found that the center frequency $f_0$ that defines a peak $I_{MAX}$ and the bandwidth $\Delta f$ (which will be referred to as "frequency characteristics") change according to the situation in the vicinity of the transmission antenna 201.

The bandwidth $\Delta f$ is defined as follows, with a frequency $f_1$ that represents a switching frequency $f_{SW}$ at which a current amount $I_S$ becomes lower than the peak $I_{MAX}$ by a predetermined ratio.

$$\Delta f = 2 \times |f_0 - f_1| \tag{1}$$

Examples of the aforementioned ratio that can be employed include $1/\sqrt{2}$, $1/2$, $1/e$, etc. In the field of telecommunications, typically, $1/\sqrt{2}$ is employed.

With the power transmitter 200 shown in FIG. 2, the frequency characteristics of the current $I_S$ that flows through the bridge circuit 205 are detected by means of the current sensor 220, and changes in the frequency characteristics are monitored. This allows a foreign object to be detected.

This method requires only the measurement of the current $I_S$ that flows through the bridge circuit 205. Thus, this allows the foreign object detector 230 to have a markedly simplified circuit configuration as compared with conventional circuit configurations, thereby allowing costs to be reduced.

In some cases, foreign object detection based on only a change in the center frequency $f_0$ leads to a problem of foreign object detection with low sensitivity. In order to solve such a problem, the foreign object detector 230 is preferably configured to judge the presence or absence of a foreign object based on the frequency $f_0$ at which the current $I_S$ becomes its peak $I_{MAX}$ and the frequency $f_1$ at which the current $I_S$ becomes lower than the peak $I_{MAX}$ by a predetermined ratio.

In the power transmitter 200 that conforms to the Qi standard, a foreign object may be detected based on the Q value of the transmission antenna 201.

$$Q = f_0/\Delta f = f_0/(2 \times |f_0 - f_1|)$$

Figure 4:
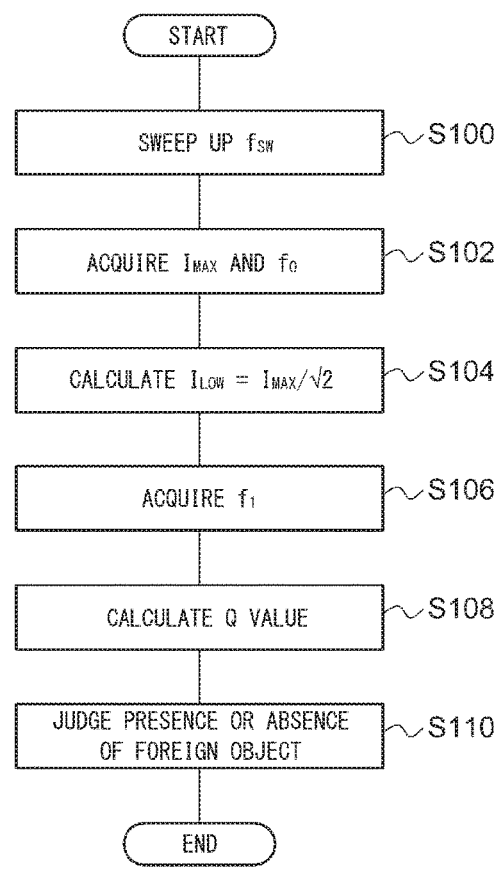
FIG. 4 is a flowchart showing an example of a foreign object detection sequence.

FIG. 4 is a flowchart showing an example of a foreign object detection sequence.

The switching frequency $f_{SW}$ is swept up with a predetermined frequency $f_S$ that is lower than the resonance frequency $f_R$ of the transmission antenna 201 as the start frequency.

In the sweeping-up step, the frequency $f_0$ and the corresponding current value $I_{MAX}$ are acquired (S102). Subsequently, the current $I_{LOW}$ is calculated by multiplying the peak current value $I_{MAX}$ by the predetermined ratio $1/\sqrt{2}$ (S104). (iii) Furthermore, the frequency $f_1$ is acquired when the detection current $I_S$ becomes the current $I_{LOW}$ thus calculated while sweeping up the switching frequency $f_{SW}$ (S106), and the Q value is calculated (S108).

The foreign object detector 230 judges the presence or absence of a foreign object based on the Q value thus calculated (S110). More specifically, the foreign object detector 230 is capable of judging the presence or absence of a foreign object based on the result of the comparison of the Q value thus calculated and a predetermined threshold value. Here, the foreign object detector 230 may receive the predetermined threshold value from the wireless power receiver. The above is the flow of the foreign object detection.

Figure 5:
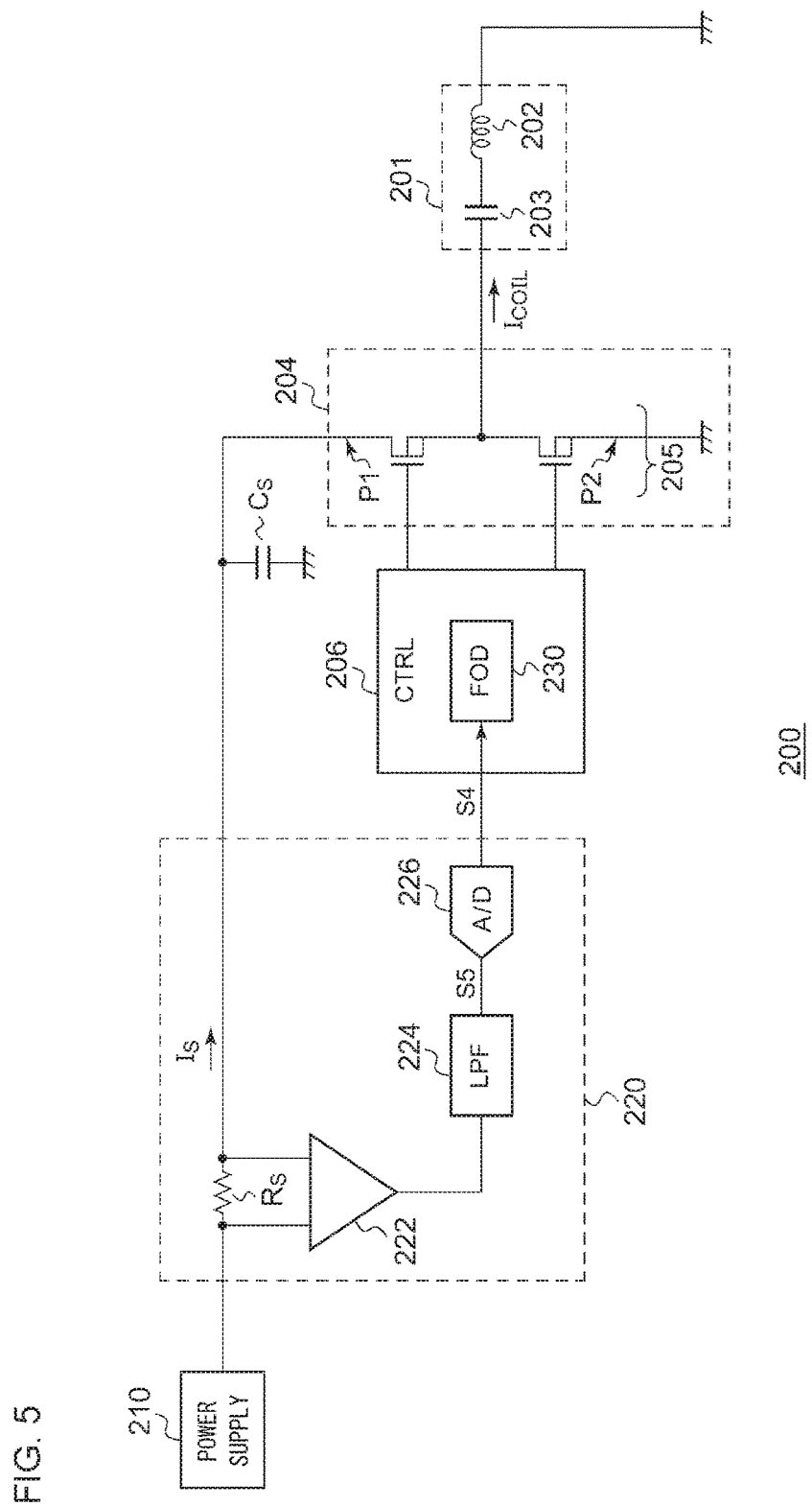
FIG. 5 is a circuit diagram showing an example configuration of the power transmitter.

Next, description will be made regarding a specific example configuration of the power transmitter 200. FIG. 5 is a circuit diagram showing an example configuration of the power transmitter 200.

The current sensor 220 uses the current $I_S$ that flows from the DC power supply 210 into the upper-side power supply terminal P1 of the bridge circuit 205 (which will be referred to as the "input current") as a detection target. The current sensor 220 includes a detection resistor $R_S$ arranged on a path of the current $I_S$ to be measured, a sensing amplifier 222 that amplifies the voltage drop $V_S$ that occurs across the detection resistor $R_S$, a low-pass filter 224 that receives the output of the sensing amplifier 222, and an A/D converter 226 that converts the output of the low-pass filter 224 into a digital value. The smoothing capacitor $C_S$ is coupled to the upper-side power supply terminal P1. Accordingly, it can also be understood that the current sensor 220 measures the current $I_S$ that flows into the smoothing capacitor $C_S$. By employing the input current $I_S$ as a detection target, such an arrangement is advantageous from the viewpoint of the protection operation.

In many cases, the power transmitter 200 has a function for calculating the electric power transmitted from itself. Accordingly, conventional power transmitters include a current detection circuit for calculating the electric power. In this case, the current detection circuit for calculating the electric power may also be used as (may be shared with) the current sensor 220.

Figure 6:
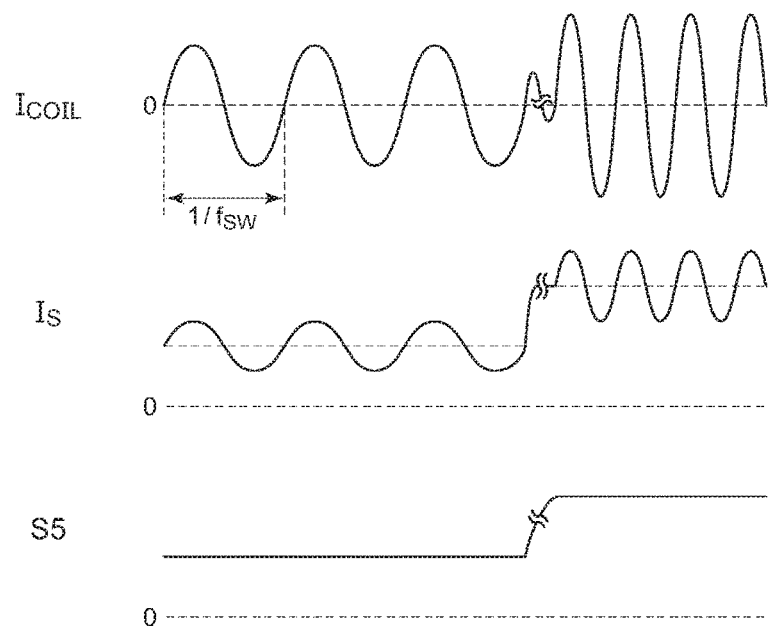
FIG. 6 is an operation waveform diagram showing the operation of the power transmitter shown in FIG. 5.

FIG. 6 is an operation waveform diagram showing the operation of the power transmitter 200 shown in FIG. 5. FIG. 6 shows a current $I_{COIL}$ that flows through the transmission antenna 201, the input current $I_S$ input to the bridge circuit 205, and an output signal S5 of the low-pass filter 224.

In theory, the input current $I_S$ corresponds to the coil current $I_{COIL}$ in a period in which a high-side transistor of the bridge circuit 205 is turned on. Accordingly, the input voltage $I_S$ has a half-wave waveform. With such an arrangement, the smoothing capacitor $C_S$ is coupled to the upper-side power supply terminal P1 (output of the DC power supply 210) of the bridge circuit 205. Accordingly, the input current $I_S$ becomes the sum of the DC component that corresponds to the amplitude of the coil current $I_{COIL}$ and the AC component that corresponds to the switching frequency $f_{SW}$. By removing the AC component that corresponds to the switching frequency $f_{SW}$ by means of the low-pass filter 224, this allows the DC component, i.e., the coil current $I_{COIL}$, to be detected.

Figure 7:
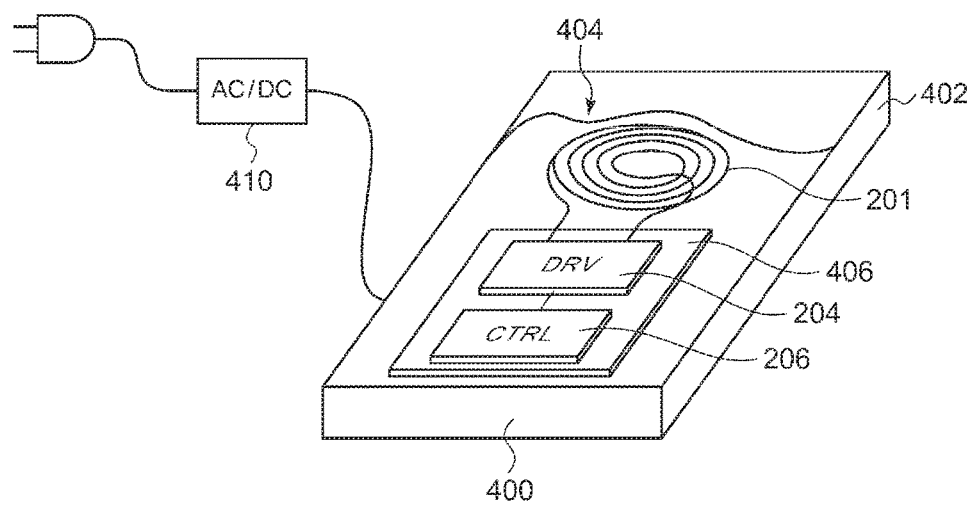
FIG. 7 is a circuit diagram showing a charger including the power transmitter.

Next, description will be made regarding the usage of the power transmitter 200. FIG. 7 is a circuit diagram showing a charger 400 including the power transmitter 200. The charger 400 charges an electronic device 500 including the power receiver 300. The charger 400 includes a housing 402, a charger stand 404, and a circuit substrate 406. The electronic device, to which electric power is to be supplied, is mounted on the charger stand 404. The driver 204, the controller 206, and other circuit components are mounted on the circuit substrate 406. The transmission antenna 201 is laid out directly below the charger stand 404. The charger 400 may receive a DC voltage via an AC/DC converter 410. Also, the charger 400 may include such an AC/DC converter as a built-in component. Alternatively, the charger 400 may receive the supply of DC electric power from an external circuit via a bus including a power supply line such as a USB (Universal Serial Bus).

The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

The current to be monitored by the current sensor 220 is not restricted to the input current $I_S$ of the bridge circuit. For example, the detection resistor $R_S$ may be arranged at a position that is closer to the ground side than the bridge circuit 205, for example. It should be noted that, in a case in which the current is measured on the ground side, the current smoothing effect of the smoothing capacitor $C_S$ cannot be expected. Accordingly, in some cases, such an arrangement requires an additional circuit and additional signal processing. It should be noted that, even in this case, such an arrangement also has an advantage of enabling a simple circuit configuration and simple signal processing as compared with a case in which the output current (i.e., coil current $I_{COIL}$) of the bridge circuit 205 is measured.

Furthermore, instead of the insertion of the detection resistor $R_S$, the on resistance of the switching transistor (high-side transistor or otherwise low-side transistor) of the bridge circuit 205 may be used. It should be noted that, in such a case of using the on resistance of the switching transistor, such an arrangement involves the measurement of internal current in the bridge circuit. Accordingly, the current smoothing effect of the smoothing capacitor $C_S$ cannot be expected. In some cases, such an arrangement requires an additional circuit and additional signal processing. It should be noted that, even in this case, such an arrangement also has an advantage of enabling a simple circuit configuration and simple signal processing as compared with a case in which the output current (i.e., coil current $I_{COIL}$) of the bridge circuit 205 is measured.

[Second Modification]

Description has been made in the embodiment regarding the driver 204 for the half-bridge circuit. Also, the present invention is applicable to an H-bridge circuit.

Third Modification

Description has been made in the embodiment regarding an arrangement in which a foreign object is detected based on the Q value. However, the present invention is not restricted to such an arrangement. In other specifications that differ from the Qi standard or specifications that will be developed in the future, a foreign object may be detected based on the change in the center frequency $f_0$ or the change in the bandwidth $\Delta f$ instead of the Q value.

While the preferred embodiments of the present invention have been described using specific terms, such description is for illustrative purposes only, and it is to be understood that changes and variations may be made without departing from the spirit or scope of the appended claims.

What is claimed is:

1. A wireless power transmitter structured to transmit an electric power signal to a wireless power receiver, the wireless power transmitter comprising:
    a transmission antenna comprising a resonance capacitor and a transmission coil coupled in series;
    a driver comprising a bridge circuit structured to apply a driving voltage to the transmission antenna;
    a current sensor structured to detect a current that flows trough the bridge circuit; and
    a foreign object detector structured to detect the current that flows through the bridge circuit while changing a switching frequency applied to the bridge circuit, and to judge a presence or absence of a foreign object based on detection results.

2. The wireless power transmitter according to claim 1, wherein the foreign object detector is structured to judge the presence or absence of a foreign object based on a frequency $f_0$ at which a peak of the current occurs, and a frequency $f_1$ at which the current is smaller than the peak by a predetermined ratio between them.

3. The wireless power transmitter according to claim 2, wherein the foreign object detector is structured:
    (i) to acquire the frequency $f_0$ and a current value $I_{MAX}$ at the frequency $f_0$ while sweeping up the switching frequency for the bridge circuit with a frequency that is lower than a resonance frequency of the transmission antenna as a start frequency;
    (ii) to calculate a current $I_{LOW}$ by multiplying the current value $I_{MAX}$ by the predetermined ratio; and
    (iii) to acquire the frequency $f_1$ when the detected current matches the current $I_{LOW}$ while the switching frequency is swept up.

4. The wireless power transmitter according to claim 2, wherein the predetermined ratio is $1/\sqrt{2}$.

5. The wireless power transmitter according to claim 4, wherein the foreign object detector is structured to calculate a Q value based on $Q=f_0/(2\times|f_0-f_1|)$, and to judge the presence or absence of a foreign object based on the Q value thus calculated.

6. The wireless power transmitter according to claim 5, wherein the foreign object detector is structured to judge the presence or absence of a foreign object based on a result of a comparison between the calculated Q value and a predetermined threshold value.

7. The wireless power transmitter according to claim 6, wherein the foreign object detector is structured to receive the threshold value from the wireless power receiver.

8. The wireless power transmitter according to claim 1, wherein the current sensor is structured to detect a current that flows into an upper-side power supply terminal of the bridge circuit from a DC power supply.

9. The wireless power transmitter according to claim 8, further comprising a smoothing capacitor coupled to the upper-side power supply terminal of the bridge circuit.

10. The wireless power transmitter according to claim 1, wherein the current sensor comprises:
    a detection resistor arranged on a path of a current to be detected;
    a sensing amplifier structured to amplify a voltage drop across the detection resistor;
    a low-pass filter structured to receive an output of the sensing amplifier; and
    an A/D converter structured to convert an output of the low-pass filter into a digital value.

11. The wireless power transmitter according to claim 1, wherein the current sensor is shared as a current detection circuit structured to detect a current required to calculate transmitted electric power.

12. The wireless power transmitter according to claim 1, structured to support the Qi standard.

13. A charger comprising the wireless power transmitter according to claim 1.

14. A foreign object detection method employed in a wireless power transmitter, wherein the wireless power transmitter comprises:
    a transmission antenna comprising a resonance capacitor and a transmission coil coupled in series; and
    a bridge circuit structured to apply a driving voltage to the transmission antenna,
    and wherein the foreign object detection method comprises:
        detecting a current that flows through the bridge circuit while changing a switching frequency of the bridge circuit; and
        judging the presence or absence of a foreign object based on a frequency $f_0$ at which a peak of the current occurs, and a frequency $f_1$ at which the current is smaller than the peak by a predetermined ratio between them.

* * * * *